US010178068B2

(12) United States Patent
Hsu et al.

(10) Patent No.: US 10,178,068 B2
(45) Date of Patent: *Jan. 8, 2019

(54) TRANSLATING NETWORK ATTRIBUTES OF PACKETS IN A MULTI-TENANT ENVIRONMENT

(71) Applicant: International Business Machines Corporation, Armonk, NY (US)

(72) Inventors: Sheng-Tung Hsu, Taipei (TW); Cheng-Ta Lee, Taipei (TW); Wei-Shiau Suen, Taipei (TW); Ming-Hsun Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,427

(22) Filed: Oct. 6, 2017

(65) Prior Publication Data

US 2018/0034768 A1 Feb. 1, 2018

Related U.S. Application Data

(63) Continuation of application No. 14/871,412, filed on Sep. 30, 2015, now Pat. No. 9,887,962.

(51) Int. Cl.
*H04L 29/06* (2006.01)
*H04L 29/12* (2006.01)
(Continued)

(52) U.S. Cl.
CPC ...... *H04L 61/2503* (2013.01); *H04L 12/4641* (2013.01); *H04L 67/10* (2013.01); *H04L 69/22* (2013.01); *H04W 4/60* (2018.02)

(58) Field of Classification Search
CPC . H04L 61/2503; H04L 12/4641; H04L 67/10; H04L 69/22; H04W 4/003
See application file for complete search history.

(56) References Cited

U.S. PATENT DOCUMENTS 8,259,571 B1  9/2012  Raphel et al.
8,695,059 B2  4/2014  Kopti
(Continued)

FOREIGN PATENT DOCUMENTS

CN  102104525 B  4/2013
EP  2677701 A1  12/2013

OTHER PUBLICATIONS

Brohi et al., "Identifying and Analyzing Security Threats to Virtualized Cloud Computing Infrastructures," Proceedings of 2012 International Cloud Computing, Technologies, Applications & Management, Dec. 2012, pp. 151-155.
(Continued)

*Primary Examiner* — Lakeram Jangbahadur
(74) *Attorney, Agent, or Firm* — Yee & Associates, P.C.; Jeffrey LaBaw (57) ABSTRACT

A method of translating network attributes of packets in a multi-tenant environment, and an appliance and a program product implementing the method. The method comprises the following steps: receiving a packet from a multi-tenant environment; referring to the information of tenants, translating a selected network attribute of the packet into a unique identity representing the packet in the multi-tenant environment; and forwarding the translated packet including the unique identity.

17 Claims, 6 Drawing Sheets

(51) Int. Cl.
*H04L 12/46* (2006.01)
*H04L 29/08* (2006.01)
*H04W 4/60* (2018.01)

(56) References Cited

U.S. PATENT DOCUMENTS

| | | | |
|---|---|---|---|
| 2012/0079134 A1* | 3/2012 | Outhred | H04L 12/4641 709/244 |
| 2012/0204219 A1* | 8/2012 | Kopti | H04L 63/20 726/1 |
| 2012/0204251 A1 | 8/2012 | Kopti | |
| 2013/0103834 A1* | 4/2013 | Dzerve | H04L 67/10 709/225 |
| 2014/0040999 A1 | 2/2014 | Zhang et al. | |
| 2015/0146736 A1* | 5/2015 | Kawai | H04L 12/4633 370/400 |
| 2016/0094514 A1 | 3/2016 | Hsu et al. | |
| 2016/0105393 A1* | 4/2016 | Thakkar | H04L 41/0823 709/220 |

OTHER PUBLICATIONS

Office Action, dated May 23, 2017, regarding U.S. Appl. No. 14/871,412, 30 pages.
Final Office Action, dated Aug. 17, 2017, regarding U.S. Appl. No. 14/871,412, 37 pages.
Notice of Allowance, dated Sep. 29, 2017, regarding U.S. Appl. No. 14/871,412, 13 pages.

* cited by examiner

TRANSLATING NETWORK ATTRIBUTES OF PACKETS IN A MULTI-TENANT ENVIRONMENT

CROSS-REFERENCE TO RELATED APPLICATION(S)

The present application is a continuation of U.S. application Ser. No. 14/871,412 filed Sep. 30, 2015, now U.S. Pat. No. 9,887,962 that is based on and claims the benefit of priority from Taiwan Patent Application 103134135, filed on Sep. 30, 2014.

BACKGROUND OF THE INVENTION

Field of the Invention

The invention relates to a method, an appliance, and a computer program product of translating network attributes of packets in a multi-tenant environment.

Description of the Prior Art

In a cloud services environment, Software as a Service (SaaS) usually encounters the problem of Multi-Tenancy. Because SaaS is provided by the way of lease, the supplier could not provide every customer with a physical machine, which would produce a considerable waste of the cost and resources.

However for a tenant in a multi-tenant framework, it must be ensured that configuration, customization, security, bandwidth, independent CPU/memory resources and so on are independent to and not influenced by other tenants. These are very essential for SaaS services; otherwise, when something happens to a tenant, other tenants might be affected accordingly.

There have been many ways to employ a multi-tenant framework, such as:
1. A site with different profiles for different customers. This way entails separate configurations with a shared resource.
2. One computer supports multiple platforms. This approach entails separate configurations while some of the resources are separate (for example, different partitions are divided such a crashed one will not affect the other) but CPU and bandwidth are shared.
3. Virtual machines (VM) are adopted for different tenants. This manner entails separate configurations and less interaction while most of the resources are still shared.

Figure 1:
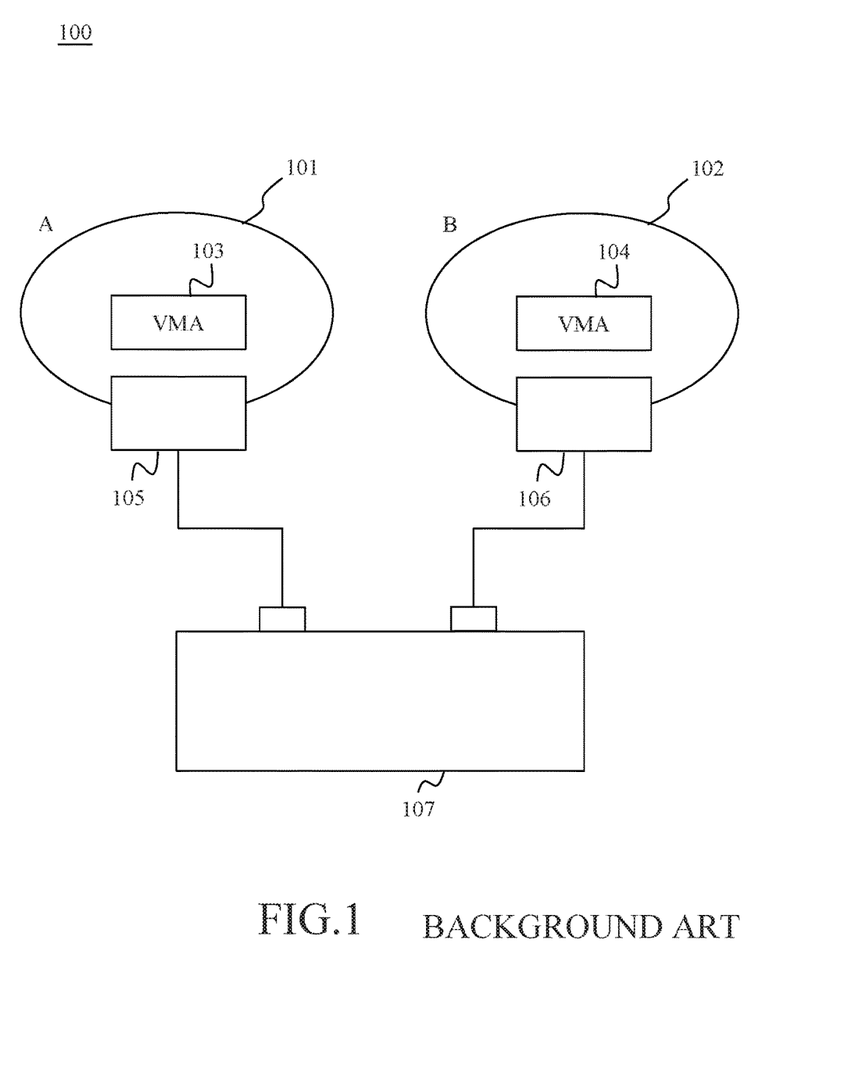
FIG. 1 is a schematic view of a conventional multi-tenant environment.

In a multi-tenant environment, two virtual machines (VM) for different tenants may share exactly the same network configurations (including MAC address, IP address, VLAN tags and so on). As illustrated in FIG. 1, a multi-tenant environment 100 includes two tenants (101, 102), as referred to tenant A and tenant B, respectively. The virtual machine host VMA 103 for tenant A and the virtual machine host VMB 104 for tenant B share the same IP address. Through network connection devices 105 and 106 respectively, VMA 103 and VMB 104 are connected to a packet processing module device 107, in order to, for example, conduct the packet inspection, so as to implement a security policy (as IPS, firewalls, and so on), or to provide traffic control (as load balancing).

Network connection devices 105 and 106 may be the devices capable of controlling network packet flow, such as switches, routers, etc. For the details not directly related to the present invention, please refer to Cisco Catalyst 3550 Series Switch from Cisco Systems, Inc. Tenant A and tenant B are not limited to a particular appliance or server, and each of tenant A and tenant B may contain an unlimited number of appliance, server, or the combination thereof. For example, tenant A and tenant B may represent a local area network (LAN), respectively.

An appliance, typically referred to as an Internet Appliance, is a device with built-in network capability and a particular function. As opposed to general-purpose computers, appliances are designed to carry out particular transactions according to particular purposes or particular services, with higher performance.

Tenants A and B may be a Virtual Local Area Network (VLAN). For internal resources of enterprise or organization, a network administrator is capable of logically grouping apparatus in different physical LANs with virtual LAN technology, so as to provide more complete protection of information security.

Please refer to the article: "IBM SmartCloud Enterprise tip: Build multiple VPNs and VLANs: VPN and VLAN features and capabilities in IBM SmartCloud Enterprise 2.0: and IBM SmartCloud Enterprise tip: Span virtual local area networks Provision and configure an instance that spans a public and private VLAN", published by Andrew Jones and others at the applicant's official website.

However, each tenant may deploy different policies with respect to the same IP address. For firewalls which have the same IP address, for example, tenants A and B may want to implement different rules: opening port 80 to allow webpages browsing for tenant A, and opening port 21 to allow transferring files with File Transfer Protocol (FTP) for tenant B. Therefore, it is difficult for a single packet processing module to analyze packets from different tenants sharing the same IP address. Prior arts modify a conventional packet processing module by adding a so-called multi-tenant awareness ability, so as to distinguish packets from different tenants with the same IP address. For example, the network overlay technology, which relies on the identity information of new tenant by packet encapsulation, was available for such purpose. By means of this technology, a conventional product of packet processing module needs to be modified to identify and parse the covered packet. Another solution is to use an IPS or a packet processing module to process or to examine packets for each tenant.

For some very old packet processing modules (so-called "legacy products"), it is an impractical waste of resources to modify them to support a multi-tenant framework. It is also very expensive to provide an IPS or a packet processing module for each tenant.

Thus it is advantageous to have a mechanism to make a conventional packet processing module, without modification, to operate in a multi-tenant environment and support at least one tenant and accordingly overcome the deficiency of the prior arts.

SUMMARY OF THE INVENTION

The present invention discloses a transparent mechanism for a network administrator, under which a conventional packet processing module could operate in a multi-tenant environment. According to the present invention, it translates the existing network attributes (such as MAC address, IP address, VLAN tags, user account names, etc.) of the traffic flow of packets, to establish a unique identity capable of representing the traffic flow in the multi-tenant environment. For example, if IP address is selected as the existing network attribute, the original IP address will be translated into a unique IP address according to the information for the tenant before sending packets to the packet processing module. So, the packet processing module would not get confused with different tenants. Besides, before implementing a packet processing policy, e.g., a security protection policy, at the packet processing module, the original IP address included in the rule in the policy is translated into a unique IP address according to the information for the tenant.

In accordance with one embodiment of the invention, one method is disclosed for translating network attributes of packets in a multi-tenant environment, and the method includes the following steps: receiving a packet from a multi-tenant environment; translating a selected network attribute of the packet into a unique identity representing the packet in the multi-tenant environment by referring to information of a tenant; and forwarding the translated packet containing the unique identity.

In accordance with another embodiment of the invention, one method is disclosed, for translating network attributes of packets in a multi-tenant environment, and the method includes the following steps: receiving a processed packet including a translated network attribute; translating the translated network attribute included in the received packet back to an original network attribute by referring to information of a tenant, wherein the translated network attribute becomes a unique identity representing the packet in the multi-tenant environment; and forwarding the packet including the original network attribute.

In accordance with another embodiment of the invention, the present invention provides a computer program product including a computer readable medium storing codes executable to implement the aforementioned method, to translate network attributes of packets in a multi-tenant environment.

In accordance with another embodiment of the invention, an appliance is disclosed which includes: a bus; a memory, connected to the bus and containing a set of instructions; a processing unit, which is connected to the bus, and which executes the set of instructions for embodying the aforementioned methods, thereby translating network attributes of packets in a multi-tenant environment.

Reference throughout this specification to features, advantages, or similar language does not imply that all of the features and advantages that may be realized with the invention should be or are in any single embodiment of the invention. Rather, language referring to the features and advantages is understood to mean that a specific feature, advantage, or characteristic described in connection with an embodiment is included in at least one embodiment of the invention. Thus, discussion of the features and advantages, and similar language, throughout this specification may, but do not necessarily, refer to the same embodiment.

The following description, the appended claims, and the embodiments of the invention further illustrate the features and advantages of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Reference throughout this specification to "one embodiment," "an embodiment," or similar language means that a particular feature, structure, or characteristic described in connection with the embodiment is included in at least one embodiment of the invention. Thus, appearances of the phrases "in one embodiment," "in an embodiment," and similar language throughout this specification may, but do not necessarily, all refer to the same embodiment.

As will be appreciated by one skilled in the art, the invention may be embodied as a computer device, a method or a computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages.

The invention is described below with reference to flowchart illustrations and/or block diagrams of systems, apparatuses, methods, and computer program products according to embodiments of the invention. It will be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 2 through FIG. 6, appliances, systems, methods, and computer program products are illustrated as structural or functional block diagrams or process flowcharts according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<Hardware Architecture>

Figure 2:
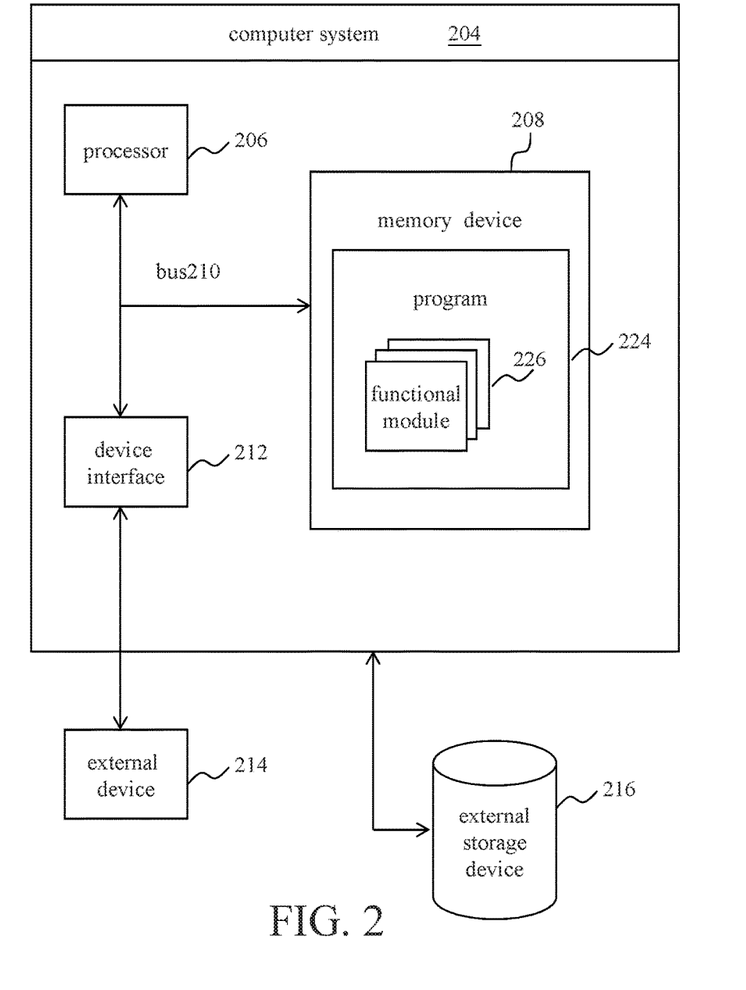
FIG. 2 illustrates a hardware architecture of a computer system in accordance with one embodiment.

FIG. 2 illustrates a hardware architecture of computer system 204 in one embodiment. The computer system 204 may be implemented as the system containing the packet intermediate module in the invention, and may be implemented as the system containing the packet processing policy intermediate module in the invention. The computer system 204 comprises a processor 206, a memory device 208, a bus 210, and a device interface 212. The processor 206 accesses program codes, such as a program 224, in the memory device 208 or an external storage device 216. The program 224 contains one or more functional modules 226 for providing the functions (illustrated with FIG. 3A through FIG. 6 and described below), such as packet intermediate module 300 and packet processing policy intermediate module 400, required by the invention. The functional module 226 may be a single instruction or multiple instructions, and may be distributed in multiple different program code segments, different programs, and multiple memory devices 208.

The bus 210 functions as a communication link of various components in the computer system 204. The computer system 204 communicates with an external device 214 via the device interface 212. Further, the computer system 204 communicates with the external device 214, the external storage device 216, or other computer devices/systems via a network. In this regard, the network can also come in the form of any type of connection, including a local area network (LAN) or a wide area network (WAN) of fixed connection, or dial-up Internet access service offered by an Internet service provider, and it is not restricted to wired or wireless connections. Furthermore, other hardware and software components (not shown, including additional computer systems, routers, and firewalls) can be included in the network.

In another embodiment, the basic framework and components of the computer system 204 can also come in the form of a typical general purpose computer device (such as a personal computer or server) or appliance (such as IBM WebSphere Datapower SOA Appliance (as described at the IBM Redbooks website) or Tivoli ISS Appliances ("IBM," "WebSphere," and "Tivoli" are the trademarks of International Business Machine, registered in USA and/or other countries).

The following will further illustrate the invention through examples, but those skilled in the art will appreciate that such examples are not intended to limit the scope of the claimed subject matter.

<Packet Intermediate Module>

Figure 3A:
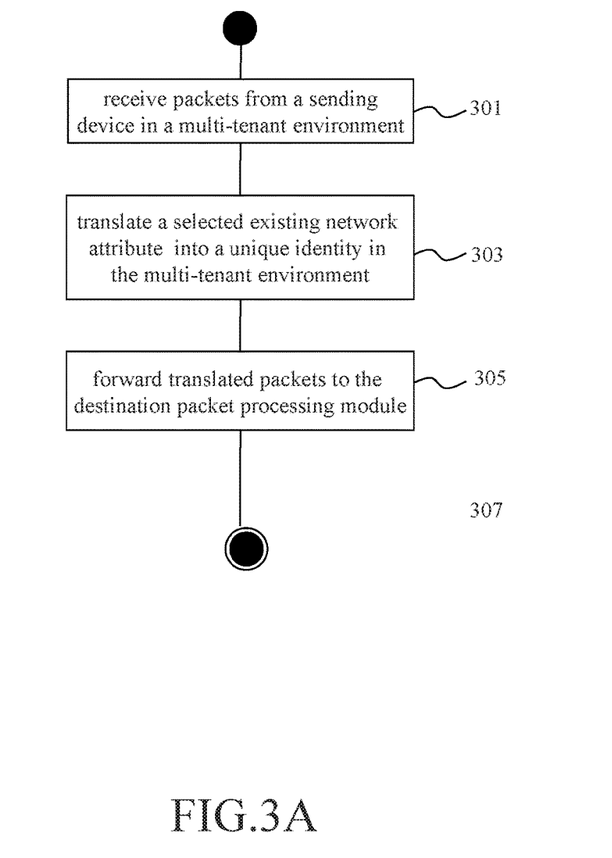
FIG. 3A and FIG. 3B are flowcharts for a method of packet intermediate module in accordance with one embodiment of the invention.
Figure 3B:
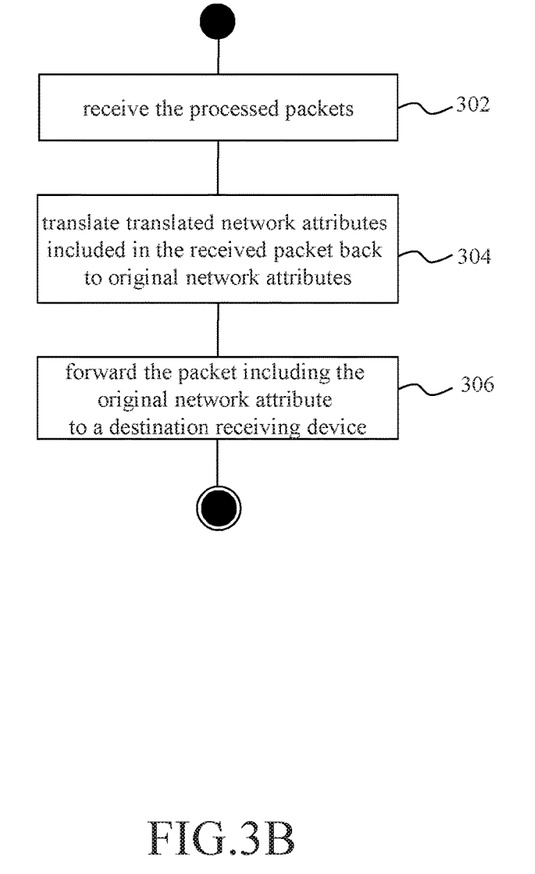

FIG. 3A and FIG. 3B are flowcharts for a method of packet intermediate module according to one embodiment of the invention. The packet intermediate module in FIG. 3A includes program modules and instructions for translating the existing network attributes (such as MAC address, IP address, VLAN tags, user account names, etc.) of the traffic flow of packet received or sent by a tenant into a unique identity capable of representing the traffic flow of packet in the multi-tenant environment, and for forwarding the translated packet to a destination packet processing module. As such, the packet processing module would not get confused with multiple tenants.

Step 301: The packet intermediate module receives packets from a sending device in a multi-tenant environment. The packet intermediate module may be located at network connecting devices 105 and 106 in the multi-tenant environment 100, and may also be located at the packet processing module device 107. Furthermore it may be located anywhere in the path from the network connecting devices 105 and 106 to the packet processing module device 107.

Step 303: An existing network attribute is selected and translated into a unique identity capable of representing the traffic flow of packet in the multi-tenant environment by referring to the information of the tenant (such as tenant A) and a network attribute translation table. The network attribute may be any network-related attribute in Layers 2 to 7 in Open System Interconnection Reference Model (OSI), such as MAC address, IP address, VLAN tag, a user account name, etc. In brief, the network attribute may be any network attribute capable of representing a unique identity of the traffic flow of packet in the multi-tenant environment.

When IP address is selected as the existing network attribute, for example, the original IP address will be translated into a unique IP address in the multi-tenant environment according to the information of the tenant before forwarding packets to the packet processing module. So, the packet processing module would not get confused with different tenants. If the packet intermediate module is located at the network connection devices 105 and 106, the packet intermediate module could directly identify information of the tenant (such as tenant A) which receives or sends the packet, so as to translate the original IP address directly and easily. If the packet intermediate module is located at the packet processing module device 107, the packet processing module device 107 shall identify the information of the tenant which receives or sends the packet firstly (such as the information about the connection ports of network connection devices 105 and 106, connected to the packet processing module device 107), in order to identify the tenant. Then, it obtains a unique identity, which is capable of representing of the traffic flow of packet in the multi-tenant environment, according to a network attribute translation table. Besides, the network attribute translation of the packet in the traffic flow could be implemented by means of Software Defined Network (SDN).

Step 305: Forward the translated packets to the destination packet processing module. The destination packet processing module 107 will process the translated packets, by referring to a built-in packet processing policy (such as a security protection policy). Besides, before implementing a packet processing policy at the destination packet processing module, the network attributes (such as IP address) included in the rule in the policy will be translated into a unique identity (such as a translated IP address) respectively according to the information of the tenant and a network attribute translation table. The network attribute translation included in the rule in the policy is further described below by referring to FIGS. 4 and 6.

Figure 5:
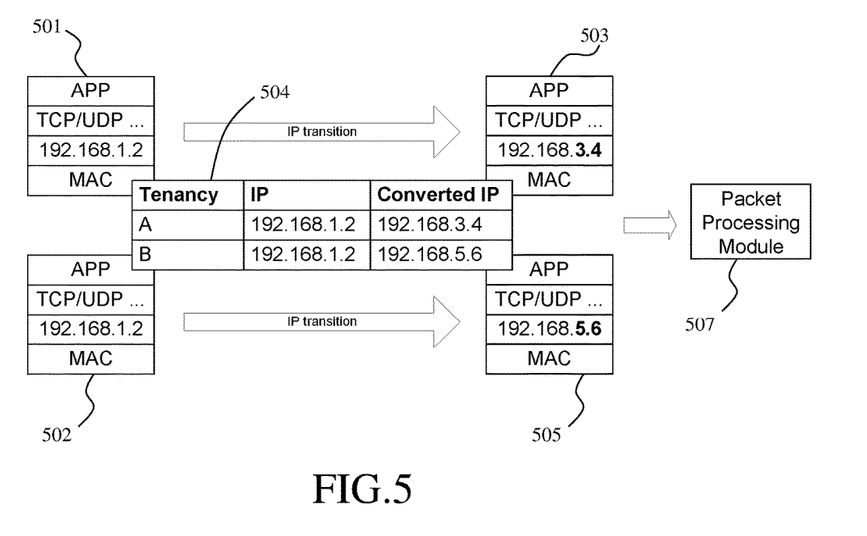
FIG. 5 illustrates translating network attributes of packets in accordance with one embodiment of the invention.

As illustrated in FIG. 5, two hosts (such as virtual machines (VM)) for different tenants may have exactly the same network configurations (such as the same MAC address and IP address). In a preferred embodiment of the invention, IP address is selected as the network attribute to be translated, while the two hosts share the same IP address. The packet intermediate module refers to a network attribute translation table 504 and translates packets 501 and 503 sent from different tenants sharing a same, original IP address 192.168.1.2 into the translated packets 503 and 505 bearing different and unique IP addresses 192.168.3.4 and 192.168.5.6. Next, the translated packets are forwarded to the destination packet processing module 507.

Also, the network attribute translation table and the packet processing policy configuration may be implemented with IBM Security SiteProtector™ System, a centralized management system. SiteProtector™ is a centralized management system, providing management of consistency, and analyzing servers, appliances, and security agents under the network framework. For more information about SiteProtector™, refer to the IBM web-based information maintained on the internet.

The packet intermediate module in FIG. 3B includes program modules and instructions for translating the translated network attribute included in the processed packet back to non-translated state (original network attribute), i.e., the non-translated network attribute.

Step 302: The packet intermediate module receives the packet processed by the packet processing module device 107. The packet includes a translated network attribute (such as the unique IP addresses 192.168.3.4 and 192.168.5.6 in the aforementioned multi-tenant environments).

Step 304: Translate the translated network attribute included in the received packet back to original network attribute, such as the original IP address 192.168.1.2, by referring to the information of the tenant (such as tenant A) and a network attribute translation table.

Step 306: Forward the packet including the original network attribute to a destination receiving device in multi-tenant environment. Accordingly the invention is applicable to conventional systems and devices without modification thereof.

<Packet Processing Policy Intermediate Module>

Figure 4:
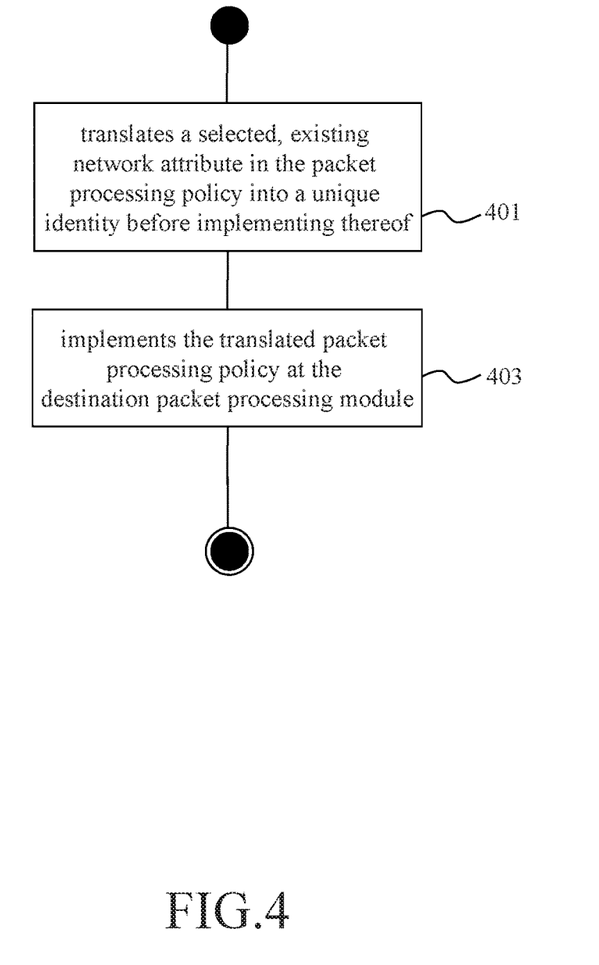
FIG. 4 is a flowchart for a method of packet processing policy intermediate module in accordance with one embodiment of the invention.

FIG. 4 is a flowchart for a method of packet processing policy intermediate module in accordance with one embodiment of the invention. The packet processing policy intermediate module includes program modules and instructions for translating a network attribute (such as an IP address) included in the rule in the policy into a unique identity (such as a translated IP address) according to information of the tenant and a network attribute translation table, before implementing a packet processing policy at the destination packet processing module.

Step 401: Before a network administrator for a tenant deploys packet processing policy for the tenant at a destination packet processing module, the packet processing policy intermediate module, by referring the information of the tenant and a network attribute translation table, translates a selected, existing network attribute in the packet processing policy into a unique identity which is able to represent the traffic flow of packet in the multi-tenant environment.

Step 403: The packet processing policy intermediate module deploys the translated packet processing policy at the destination packet processing module.

Figure 6:
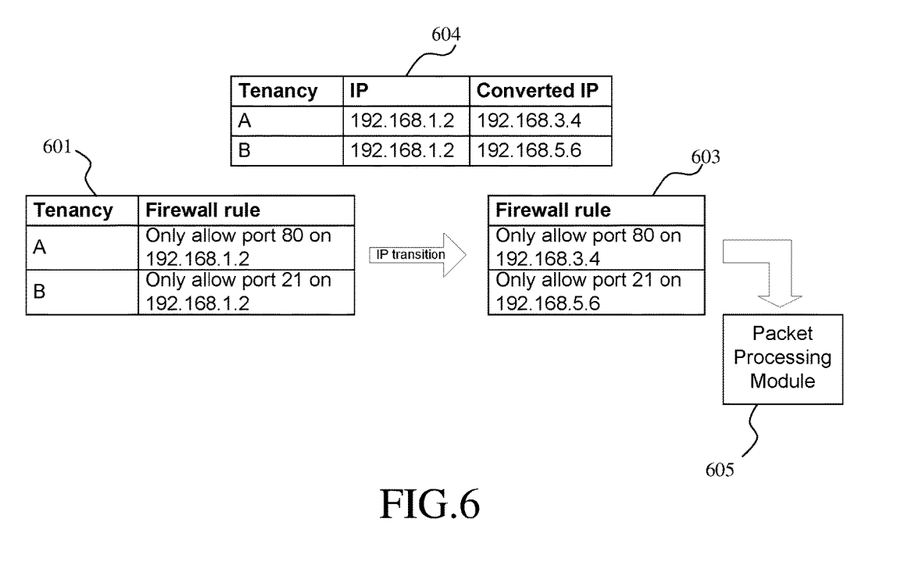
FIG. 6 illustrates translating network attributes of packet processing policy in accordance with one embodiment of the invention.

As illustrated in FIG. 6, each tenant may deploy different policies for the same IP address 192.168.1.2. For firewalls which have the same IP address, for example, tenants A and B may want to implement different rules: opening port 80 to allow webpages browsing for tenant A, and opening port 21 to allow transferring files with File Transfer Protocol (FTP) for tenant B. The packet processing policy intermediate module refers to a network attribute translation table 604 and translates a packet processing policy containing the same original IP address 192.168.1.2 shared by different tenants into the packet processing policy 603 which contains different and unique IP addresses 192.168.3.4 and 192.168.5.6. Next, the translated packet processing policy is deployed at the destination packet processing module 605.

The packet processing policy intermediate module may be located at a proxy among tenants in the multi-tenant environment 100, and may also be located at the packet processing module device 107, so as to transfer the network attributes in the packet processing policy for the tenant, such as an IP address.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method for translating network attributes in a packet processing policy in a multi-tenant environment, comprising:

before implementing a packet processing policy of a tenant, translating a selected and existing network attribute included in a rule in the packet processing policy into a unique identity representing a packet in the multi-tenant environment by referring to information of the tenant and a network attribute translation table; and implementing the packet processing policy including the unique identity, wherein translating the selected and existing network attribute is performed responsive to receiving a packet, wherein the packet is a translated packet formed by translating a selected network attribute of the packet into a unique identity representing the packet in the multi-tenant environment by referring to information of the tenant.

2. The method of claim 1, wherein the packet processing policy is implemented by a packet processing module configured to conduct a packet inspection to implement a security policy.

3. The method of claim 2, wherein implementing the packet processing policy comprises deploying the packet processing policy at the packet processing module, and wherein the network attribute is any network-related attribute in Layers 2 to 7 in Open System Interconnection Reference Model (OSI), which comprises MAC address, IP address, VLAN tags and user account names.

4. The method of claim 3, wherein the network attribute is the MAC address.

5. The method of claim 1, wherein at least two tenants in the multi-tenant environment deploy a respective different packet processing policy for a same IP address.

6. The method of claim 5, wherein each of the deployed policies designates a port to be used when processing a data packet designating the same IP address.

7. An appliance, comprising:

a bus;

a memory connected to the bus, wherein the memory contains a set of instructions; and a processing unit connected to the bus, wherein the processing unit executes the set of instructions to perform steps of:

before implementing a packet processing policy of a tenant, translating a selected and existing network attribute included in a rule in the packet processing policy into a unique identity representing a packet in a multi-tenant environment by referring to information of the tenant and a network attribute translation table; and implementing the packet processing policy including the unique identity, wherein translating the selected and existing network attribute is performed responsive to receiving a packet, wherein the packet is a translated packet formed by translating a selected network attribute of the packet into a unique identity representing the packet in the multi-tenant environment by referring to information of the tenant.

8. The appliance of claim 7, wherein the packet processing policy is implemented by a packet processing module configured to conduct a packet inspection to implement a security policy.

9. The appliance of claim 8, wherein implementing the packet processing policy comprises deploying the packet processing policy at the packet processing module, and wherein the network attribute is any network-related attribute in Layers 2 to 7 in Open System Interconnection Reference Model (OSI), which comprises MAC address, IP address, VLAN tags and user account names.

10. The appliance of claim 9, wherein the network attribute is the MAC address.

11. The appliance of claim 7, wherein at least two tenants in the multi-tenant environment deploy a respective different packet processing policy for a same IP address.

12. The appliance of claim 11, wherein each of the deployed policies designates a port to be used when processing a data packet designating the same IP address.

13. A computer program product for translating network attributes in a packet processing policy in a multi-tenant environment, the computer program product comprising a non-transitory computer readable medium storing codes, wherein the codes are executable on an appliance by a processor to implement a method comprising steps of:

before implementing a packet processing policy of a tenant, translating a selected and existing network attribute included in a rule in the packet processing policy into a unique identity representing a packet in the multi-tenant environment by referring to information of the tenant; and implementing the packet processing policy including the unique identity and a network attribute translation table, wherein translating the selected and existing network attribute is performed responsive to receiving a packet, wherein the packet is a translated packet formed by translating a selected network attribute of the packet into a unique identity representing the packet in the multi-tenant environment by referring to information of the tenant.

14. The computer program product of claim 13, wherein the packet processing policy is implemented by a packet processing module configured to conduct a packet inspection to implement a security policy, wherein implementing the packet processing policy comprises deploying the packet processing policy at the packet processing module.

15. The computer program product of claim 13, wherein at least two tenants in the multi-tenant environment deploy a respective different packet processing policy for a same IP address.

16. The computer program product of claim 15, wherein each of the deployed policies designates a port to be used when processing a data packet designating the same IP address.

17. A method for translating network attributes in a packet processing policy in a multi-tenant environment, comprising:

before implementing a packet processing policy of a tenant, translating a selected and existing network attribute in the packet processing policy into a unique identity representing a packet in the multi-tenant environment by referring to information of the tenant, wherein translating the selected and existing network attribute is performed responsive to receiving a packet from a network appliance;

implementing the packet processing policy including the unique identity;

receiving, by the network appliance, the packet from the multi-tenant environment;

forming, by the network appliance, a translated packet by translating a selected network attribute of the packet into a unique identity representing the packet in the multi-tenant environment by referring to information of a tenant; and sending, by the network appliance, the translated packet to the packet processing module, wherein the packet processing policy is implemented by a packet processing module configured to conduct a packet inspection to implement a security policy.

* * * * *